Figure 1:
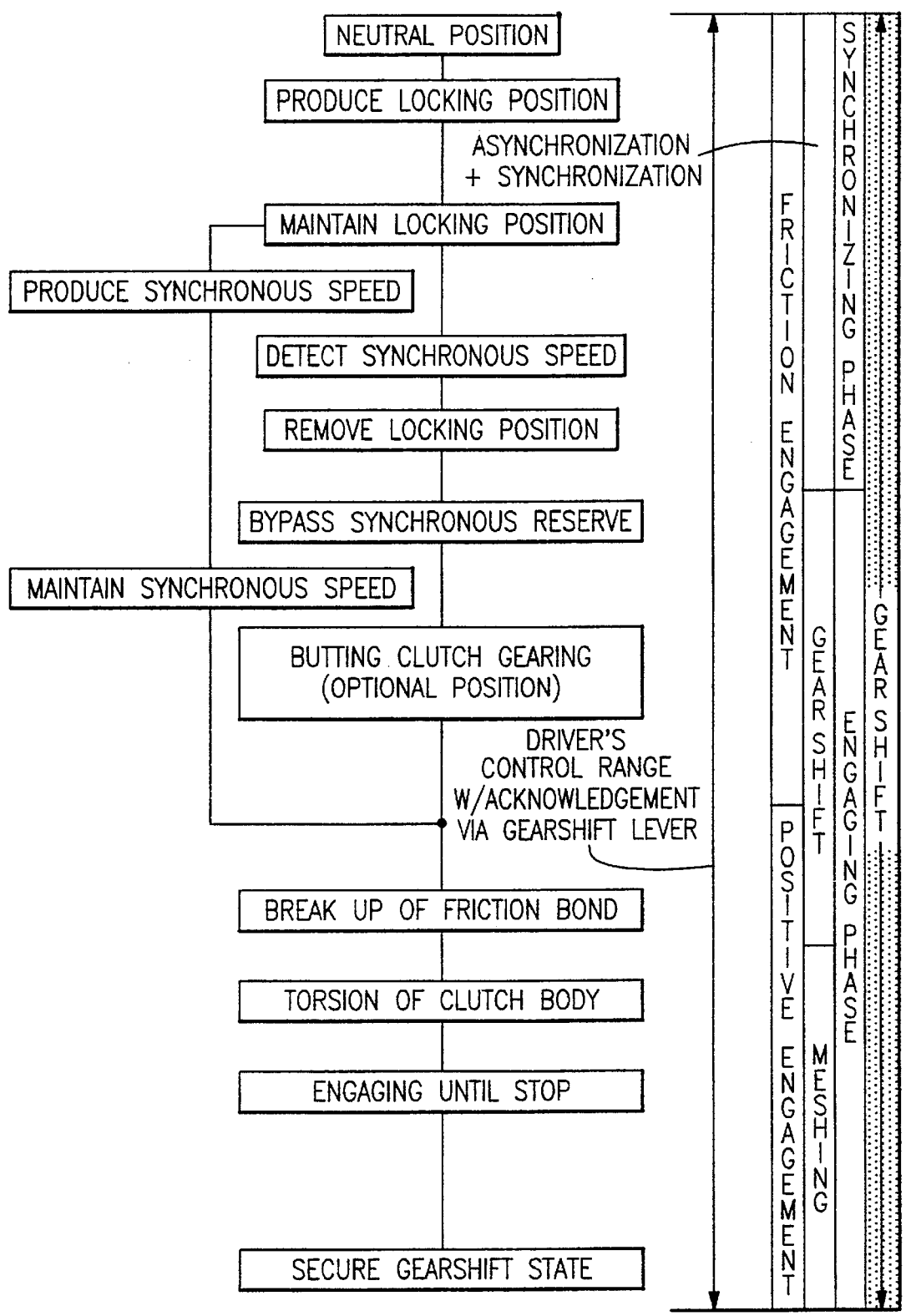

United States Patent [19]

Bailly

[11] Patent Number: 5,651,439
[45] Date of Patent: Jul. 29, 1997

[54] TRANSMISSION SHIFT SYSTEM WITH A SYNCHRONIZING ARRANGEMENT

[75] Inventor: Gerhard Bailly, Friedrichshafen, Germany

[73] Assignee: ZF Friedrichshafen AG, Friedrichshafen, Germany

[21] Appl. No.: 586,643

[22] PCT Filed: Jul. 19, 1994

[86] PCT No.: PCT/EP94/02371

§ 371 Date: Feb. 26, 1996

§ 102(e) Date: Feb. 26, 1996

[87] PCT Pub. No.: WO95/03495

PCT Pub. Date: Feb. 2, 1995

[30] Foreign Application Priority Data

Jul. 23, 1993 [DE] Germany ............... 43 24 815.2

[51] Int. Cl.⁶ ........................................... F16D 23/06
[52] U.S. Cl. ............... 192/53.34; 192/53.4; 192/69.82; 192/108; 192/114 T
[58] Field of Search ............... 192/53.34, 53.3, 192/53.4, 53.5, 52.6, 69.82, 114 T, 108

[56] References Cited

U.S. PATENT DOCUMENTS

| | | | |
|---|---|---|---|
| 2,130,895 | 9/1938 | Ness ............... | 192/53.5 X |
| 2,152,552 | 3/1939 | Lindstrom ............... | 192/53.5 |
| 2,393,398 | 1/1946 | Nabstedt ............... | 192/53.5 |
| 3,385,407 | 5/1968 | Kleinhans et al. ............... | 192/53.5 X |
| 4,131,185 | 12/1978 | Schall ............... | 192/53.5 |
| 4,271,943 | 6/1981 | Kuzma . | |

FOREIGN PATENT DOCUMENTS

| | | |
|---|---|---|
| 680 423 | 8/1939 | Germany . |
| 27 54 382 | 4/1979 | Germany . |
| 2184177 | 6/1987 | United Kingdom . |

*Primary Examiner*—Rodney H. Bonck
*Attorney, Agent, or Firm*—Davis and Bujold

[57] ABSTRACT

The invention concerns a transmission shift system with a synchronizing arrangement. A rotary shaft and a gear rotating at different speeds can be coupled together with positive engagement at synchronous speed, by means of an annular sliding sleeve axially movable by a gearshift force, wherein a clutch gearing of the sliding sleeve meshes in a corresponding clutch gearing of the gear or of a clutch body connected with the gear. Between the sliding sleeve and the gear is situated a synchronizer ring. Parts of the gear or of the clutch body together with parts of the synchronizer ring form a positively engaged clutch. In the absence of synchronism, the axial movement of the sliding sleeve is locked by blocking faces of a locking device, the clutch gearing (4, 12) and the locking device (8, 16) being separated from each other. The clutch gearing (4) of the sliding sleeve (6) and the clutch gearing (12) of the gear or clutch body (14) have stub ends. At least one elastic element (26) is provided for dampening the clutch gearing (4, 12). The initial gearshift force (18) can be stored. A ratchet device (20) can be provided to hold fast the sliding sleeve (6) against the force of the elastic element (26) after elimination of the gearshift force (18)(FIG. 4D).

10 Claims, 5 Drawing Sheets

TRANSMISSION SHIFT SYSTEM WITH A SYNCHRONIZING ARRANGEMENT

The invention concerns a transmission shift system with locking synchronization.

Multi-step gear transmissions are used today practically exclusively for transmission of the input power and adaptation of the engine torque to the tractive force required by the vehicle.

The transmission shift can be considerably simplified by means of a synchronizing arrangement. During synchronization, the speed adaptation of the transmission units to be interconnected is carried out automatically or controlled in order to thus avoid double clutching when upshifting or double clutching with actuation of the throttle when downshifting. The security in traveling is clearly increased, even in critical traveling situations, since gearshifting is possible quickly, securely and also noiselessly. The right foot of the driver, for example, can remain upon the brake in a downshift when driving downhill.

A synchronization arrangement has to solve the following problems:

speed adaptation of two transmission elements rotating at different speeds and of the parts connected thereto, so that they can be interconnected with positive engagement without grating noise;

locking of the positively engaged connection until synchronous speed of the transmission elements to be connected in order to prevent grating and damage of the positively engaged gearshift elements;

release of the lock at the moment of synchronous speed;

speed adaptation within the shortest time and with as small as possible gearshift force;

operation security even under unfavorable circumstances, such as in the case of cold, viscous transmission oil or of extremely quick tearing asunder of the gears.

Taper adapters have been widely propagated in the synchronization. In this system, conical friction cones are used for the non-positive speed adaptation of the transmission elements to be connected. This type of synchronizing arrangement is used in transmissions of both passenger and commercial vehicles.

Such locking synchronization has been disclosed, for example, in "ZF-B-Sperr-synchronisierung"—publication 42290/R 2964-367 of March 1967.

The locking synchronization there described is designed so that a synchronizer ring provided with an outer gearing, when pressed on the friction cone of the clutch body, effects a rotation motion limited by stops on the synchronizing body. This rotation has the consequence that the chamfered front tooth faces of the synchronizer ring press against those of the sliding sleeve and thus prevent further movement of the sleeve. Only when the friction cone faces have contributed to the synchronous speed of the parts to be coupled does the constant pressure of the sliding sleeve cause a turn down of the synchronizer ring. The lock is thus released and the sliding sleeve is inserted into the gearing of the clutch body.

In the idling speed, the sliding sleeve is in an axial central position. Stop bolts are compressed by springs in detents of the sliding sleeve. The idler wheels can freely rotate on their shaft. The speed difference between the synchronizer ring and the clutch body and the drag torque between the friction faces thereof cause the synchronizer ring to abut on the rotation stop of the sliding sleeve. The chamfered front tooth faces of the sliding sleeve and synchronizer ring are opposite to each other.

In the locking position the sliding sleeve has first pushed the synchronizer ring, via the stop bolts and pressure pieces, to the friction cone of the clutch body. The front tooth faces have thus assumed transmission of the gearshift force from the sliding sleeve directly to the synchronizer ring. As long as a speed difference exists between the synchronizer ring and the clutch body, the friction torque on the friction cone faces of the synchronizer ring and the clutch body is stronger than the restoring torque through the chamfered front tooth faces. The sliding sleeve is therefore locked against engagement with the clutch body.

Only when the speed difference between the synchronizer ring and clutch body has been compensated and the friction torque thus removed, does the sliding sleeve move the synchronizer ring back to the "tooth on tooth gap" position. The sliding sleeve is then inserted into the likewise front-side chamfered gearing of the clutch body over the locking gearing of the synchronizer ring.

Regarding operation and production costs this known synchronizing arrangement needs considerable improvement. In need of special improvement are the great need of gearshift force in the lower speed levels and the unsatisfactory shifting feel which makes itself noticeable in certain hookedness in the gearshifting operation, in an unsatisfactory unlocking retardation and in power peaks when meshing. There are power peaks after synchronizing generally designated as "2nd point" which are produced by the buildup of a speed difference in the free flight phase or moment of impact in the butting of the gearings combined with a long moment of inertia. They become perceptible on the gearshift lever as accelerations. The synchronization of the known kind also requires large installation space. Existing claims for reductions and lighter weight do not take this into consideration.

The usual synchronization arrangements make available the three basic functions:

optionally frequent lockable and releasable connection of two parts rotating on a common axis, energy transmission to or energy removal from one rotating part (accelerations, brakings), regulation of the speed difference between two parts rotating about a common axis to a value equal to or near zero.

Observing a gearshifting operation of the known synchronizing arrangement with regard to the negative influence on the gearshift feel, the phases after reaching synchronous running are specially conspicuous.

The removal of the locking position is only possible by rotating the free rotary masses by one half tooth pitch of the clutch gearing using force on the gearshift lever. The synchronizer ring is designed as a secure lock by the selection of cone angle and locking gearing geometry. An equally intense reaction torque of the inert rotary mass acts via the friction cone against the unlocking torque abutting on the locking gearing, and thus prevents a separate rotation of the ring relative to the free rotary masses. Only in the "free flight phase" between unlocking and butting of the clutch gearing should the synchronizer ring have been released from the friction cone. During meshing of the clutch gearing adherence would cause a break away of the ring and therewith added need of force.

Disadvantages result on the free rotary masses of the transmission during intense drag torques, due to the absence of torque transmission in the "free flight phase". During the short period of time without torque transmission between the rotary masses to be coupled, a speed difference again builds up. Correspondingly hard impact and therewith rejecting forces make themselves disagreeably noticeable when the clutch gearing strikes on the gearshift lever.

The problem to be solved by this invention is to obtain an improved gearshift feel in a uniform shift force cycle with small shifting strokes and light shift forces for transmission shift systems with synchronizing arrangements. The problem is solved by a transmission shift system with the feature of claim 1. Embodiments are objects of sub-claims.

To improve the existing shortcomings, the locking device, which prevents a positively engaged connection of the clutch gearing during the synchronization phase, is first spatially separated from the clutch gearing.

The clutch gearings of the presently known synchronizing arrangements have facets which allow the meshing operation. Since the position of the teeth of the sliding sleeve and clutch body relative to each other is accidental in the meshing phase, the free rotary mass in the transmission must be twisted so that the clutch gearing reaches an adequate position for meshing, prior to positively engaging the connection.

Contrary to this, the clutch gearing proposed by the invention has absolutely no facets. The probability that the teeth of the sliding sleeve and clutch body be before each other in a position capable of meshing is very remote and also is not favored by the lack of facets. In spite of this, in order to give an impression that the shifting operation develops customarily to the gearshifting vehicle driver, the clutch gearing is dampened and can elude the axial shifting pressure. In the gearshift end position, the shifting mechanism can be stopped by a detent device so that the tightened spring remains tightened, even after release of the gearshift lever by the driver and elimination of the axial gearshift pressure.

After the driver terminates the gearshift operation, the front faces of the clutch gearing provided for the torque transmission are with great probability butting under prestress of the spring.

If a meshing has accidentally occurred already, the gearshifting operation is totally terminated. Otherwise the vehicle clutch is closed in the state of the tightened butting of the gearings and the increasing torque twists the gearings against each other. The gearings then mesh and the gearshifting is terminated. A premature torsion of the gearings against each other and a subsequent meshing is also possible due to drag torques on the wheel set of the transmission.

Due to the elimination of the meshing slants on the clutch gearings, the gearshift stroke becomes shorter in comparison with the known synchronizing arrangements. Said advantage can be used for an increase of the ratio between gearshift lever and clutch gearing. The required gearshift force can thereby be clearly reduced.

Figure 2:
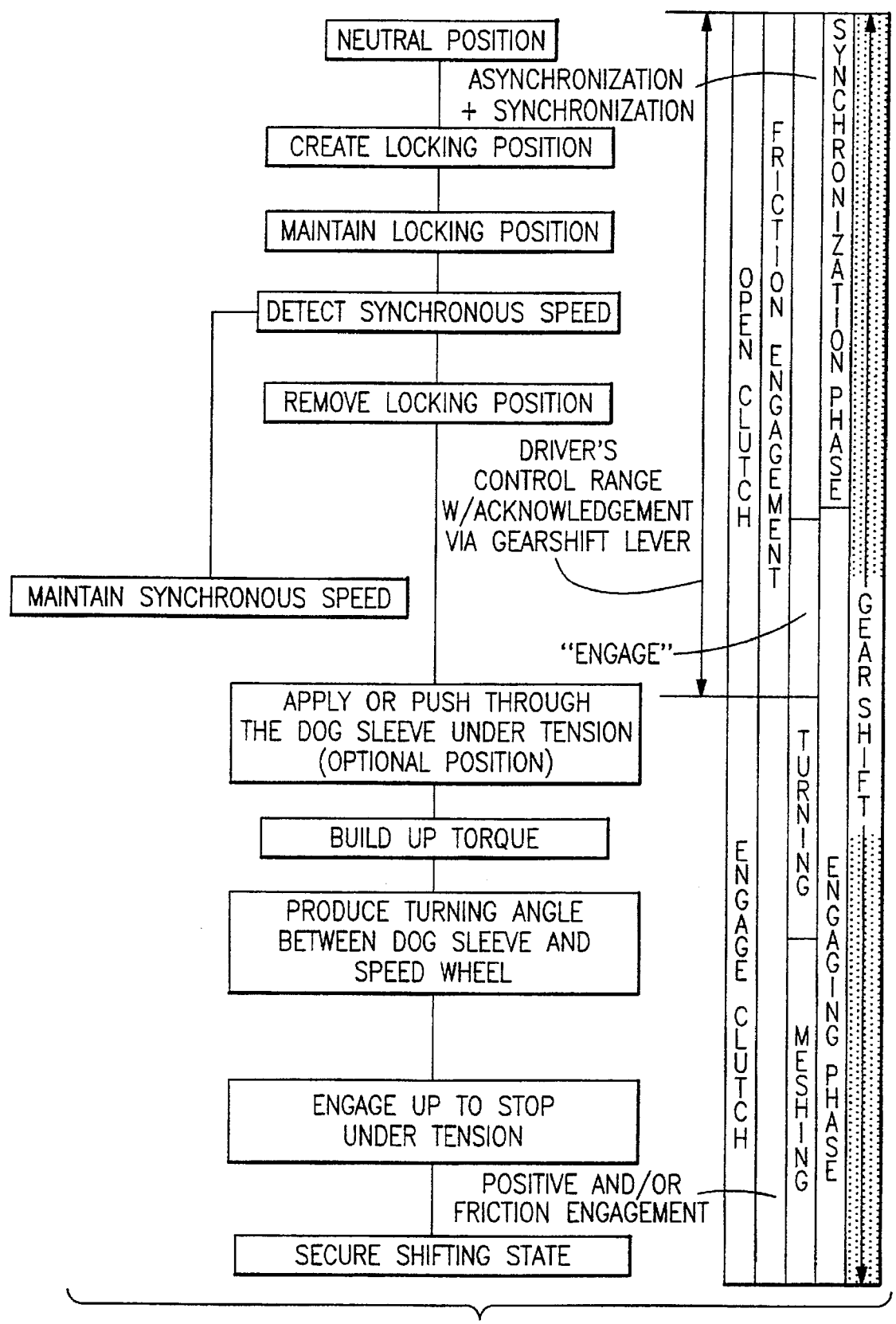
Figure 3A:
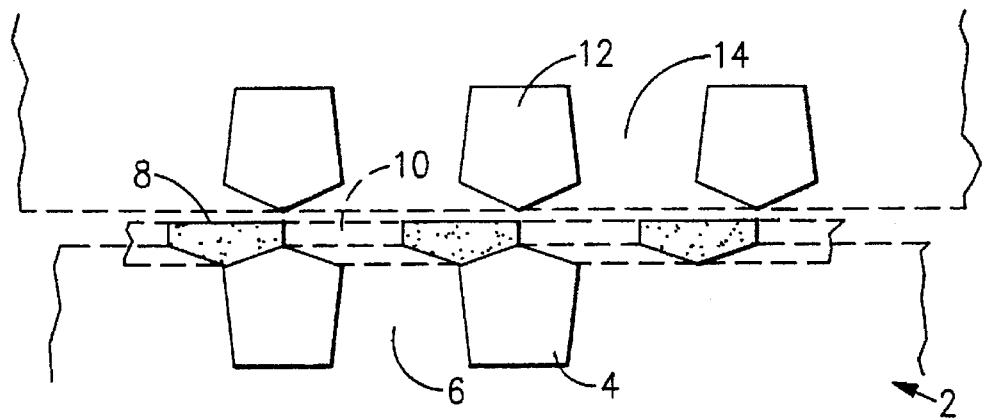
Figure 3B:
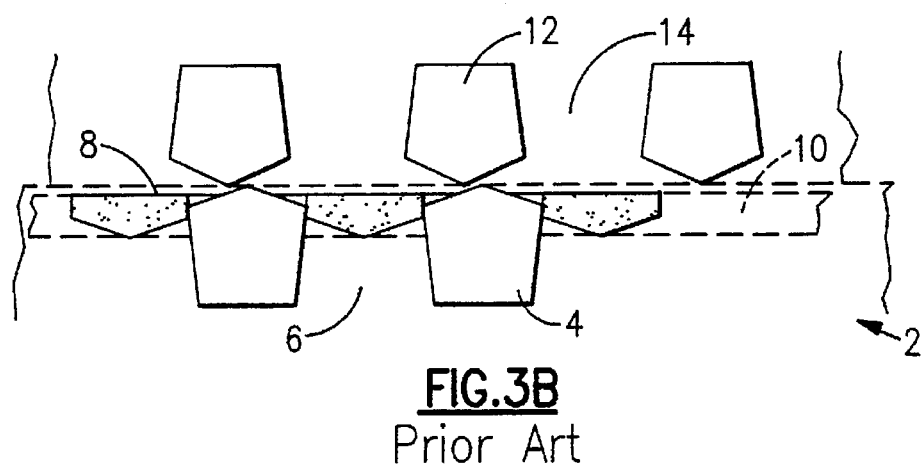
Figure 3C:
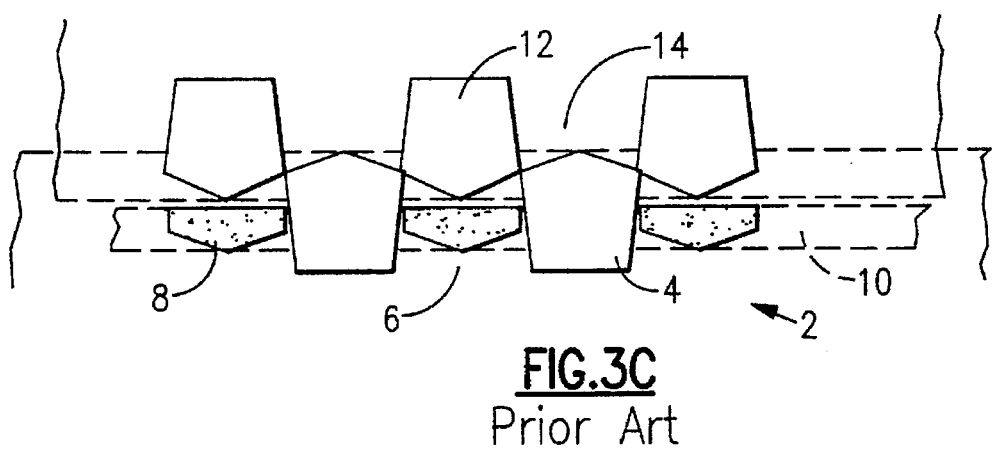
Figure 4A:
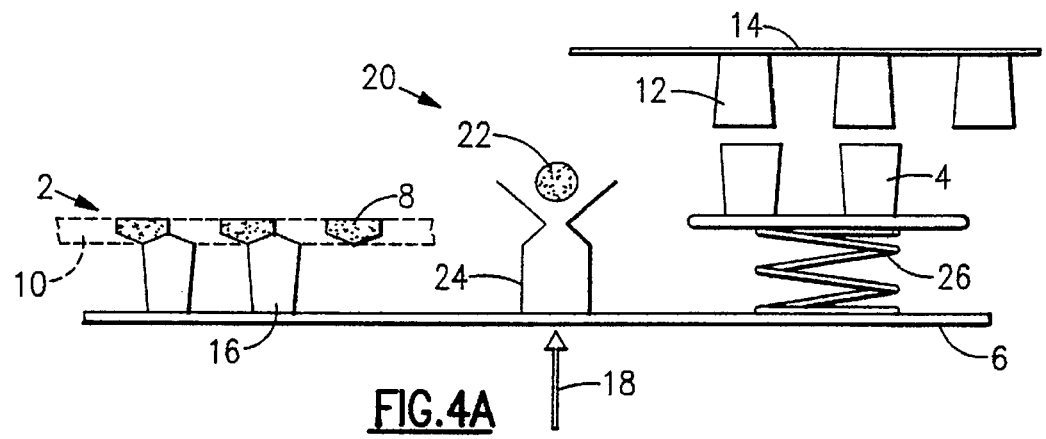
Figure 4B:
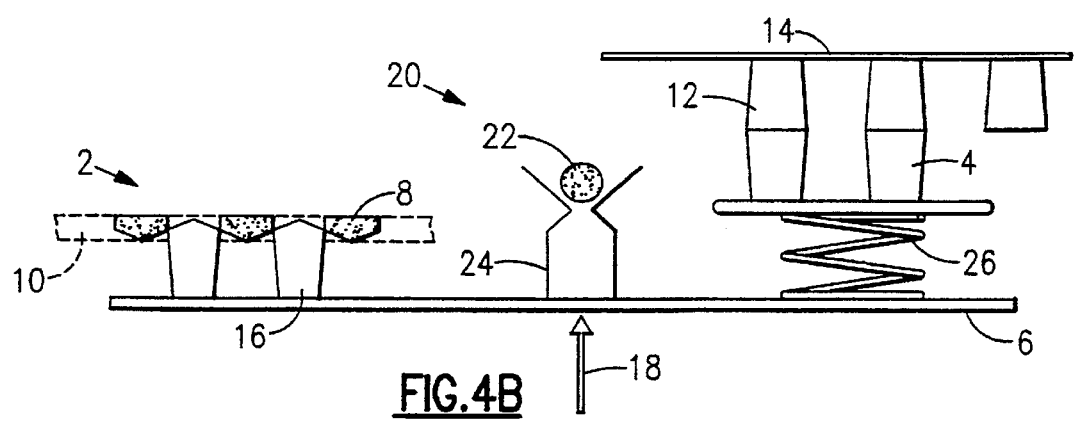
Figure 4C:
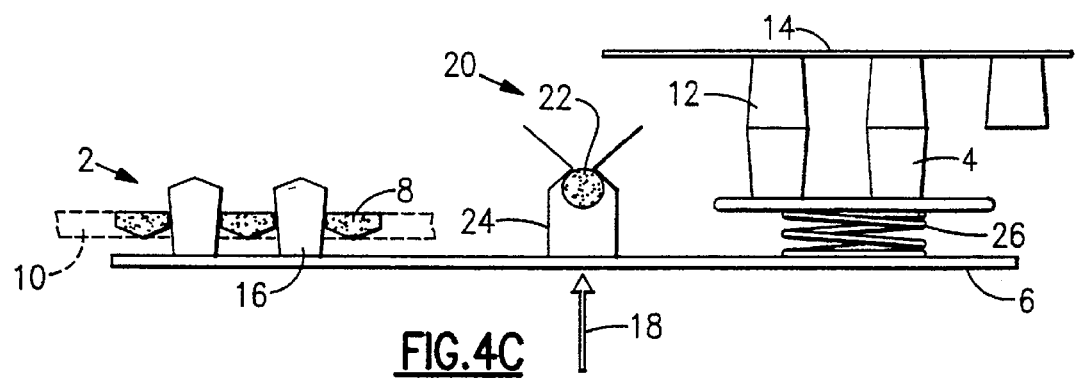
Figure 4D:
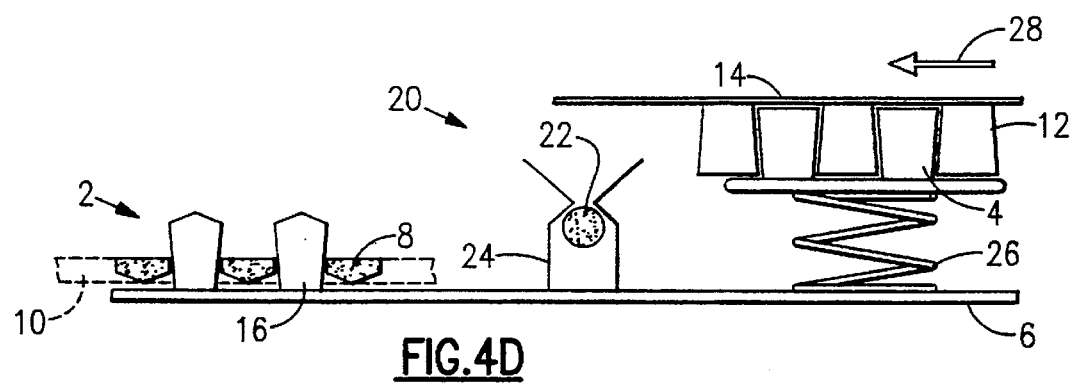
Figure 5:
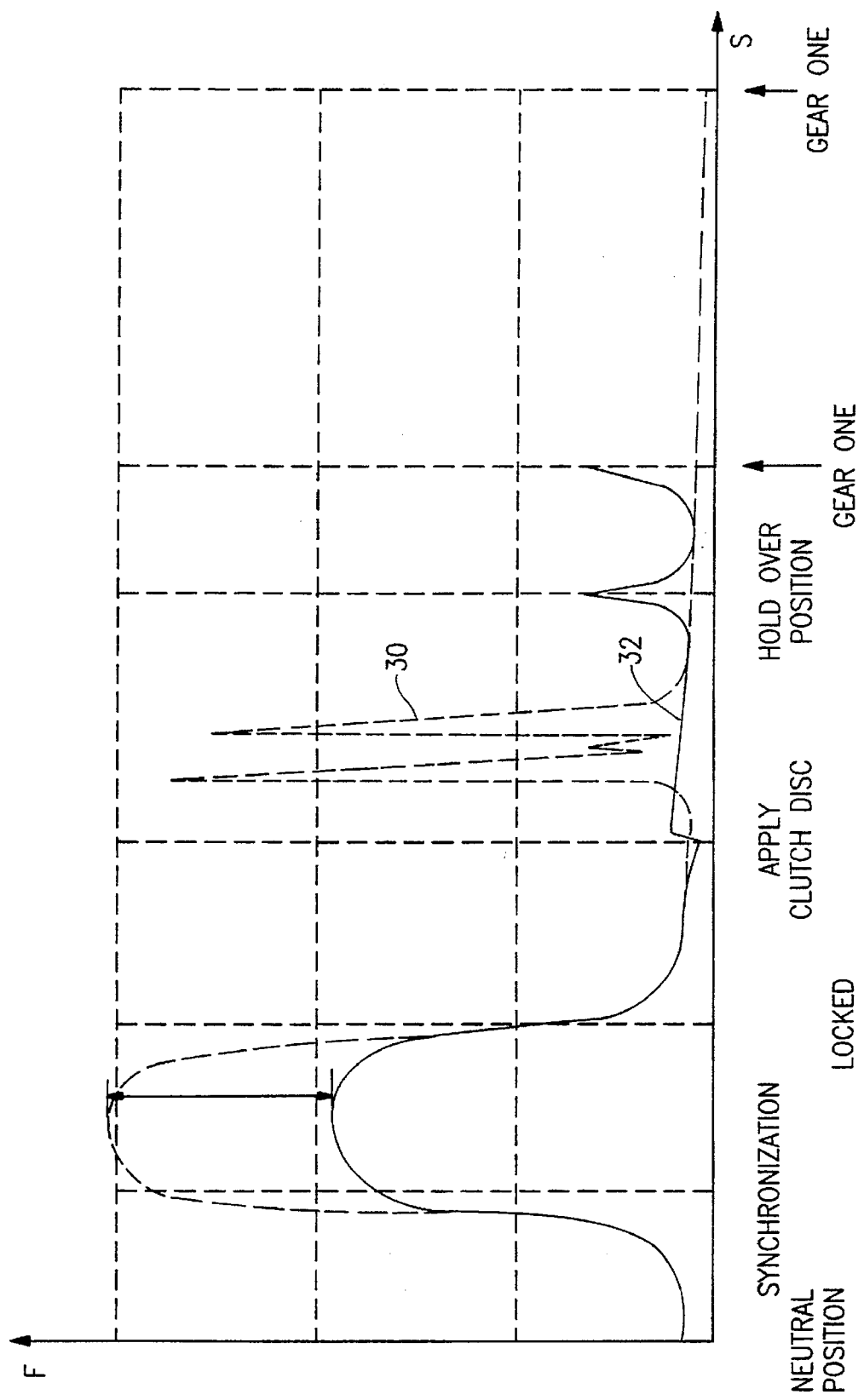

The invention is explained in detail with reference to the figures. They show:

FIG. 1 the basic cycle of a gearshifting operation according to the prior art;

FIG. 2 the basic cycle of a gearshifting operation according to the invention;

FIGS. 3A, 3B and 3C, respectively, a locking and meshing arrangement of the prior art in three steps of operation;

FIGS. 4A, 4B 4C and 4D, respectively, a locking and meshing arrangement of the present invention in four steps of operation; and FIG. 5 an illustration of the cycle of the gearshift force.

In FIG. 1 is shown the basic cycle of a known gearshifting operation.

FIG. 2 shows the changed illustration of the gearshifting operation with a synchronizing device according to the invention.

FIG. 3 diagrammatically shows the fundamental locking and meshing operations of known synchronizing arrangements. Parts of a synchronizing arrangement 2 are shown. The gearings 4 of a sliding sleeve 6 fit the gearings 8 of a synchronizer ring 10 and the gearings 12 of a clutch body 14. In the locking position in FIG. 3A the sliding sleeve has first moved the synchronizer ring 10 toward the clutch body 14. The front tooth faces of the gearings 4, 8 have thus assumed the transmission of the gearshift force from the sliding sleeve 6 directly to the synchronizer clutch body 14, the friction torque on the friction cone faces, not shown, of synchronizer ring 10 and clutch body 14 is stronger than the restoring torque through the chamfered front tooth faces of the gearings 4, 8. Therefore, the sliding sleeve 6 is locked against engaging into the clutch body 14.

Only when the speed difference between the synchronizer ring 10 and the clutch body 14 has been compensated and the friction torque has been thus removed does the sliding sleeve 6 cause the synchronizer ring 10 to rotate back to the "tooth on tooth gap" position. The gearings 4 of the sliding sleeve 6 and the gearings 12 of the clutch body 14 here come into contact (FIG. 3B). The free rotary masses are twisted over the chamfered front faces thereof, and, passing over the gearing 8 of the synchronizer ring 10, the sliding sleeve 6 is inserted into the gearing 12 of the clutch body 14 likewise chamfered on the front side (FIG. 3C).

Observing the operations of the gearings 4, 8 when shifting from the neutral position up to the introduced gear, it becomes clear that a portion of a few millimeters of the whole shift stroke is stored for preparing the meshing gradient on the torque-transmitting gearings 4, 12. From a functional point of view, this means that the shifting stroke is prolonged by an operation the course of which is to be regarded not only as unsatisfactory but also secondary in the sense of the basic operation.

This portion of the shift stroke is spared in favor of the ratio between gearshift lever and sliding sleeve, with a resulting reduction of the gearshift force or decrease of the gearshift stroke.

The synchronizing arrangement proposed by the invention is based on the fact that after termination of the gearshifting movement on the gearshift lever, the appropriate gear must not be introduced positively engaged. Thus, the rotary masses of the transmission, accidentally positioned relative to each other after the synchronizing operation, do not have to be forced into a meshing position.

FIG. 4 shows the fundamental cycle of a gearshifting operation by a synchronizing arrangement according to the invention. During the gearshifting operation the phases of locking and unlocking remain unchanged compared to the known synchronizing arrangements.

The locking gearing of a synchronizing arrangement 2 consists of the gearing 8 of the synchronizer ring 10 and the gearing 16 of the sliding sleeve 6. The locking gearing is designed as an autonomous operational unit and can be situated independently of the clutch gearing. The clutch gearing is formed by the gearing 4, the sliding sleeve 6 and the gearing 12 of the clutch body 14. By virtue of this functional separation, the locking gearing can be advantageously utilized with optimal practicality and use can be made of the influence of friction cone diameter and effective diameter of the gearing on the locking security.

In the locking position (FIG. 4A), the sliding sleeve 6 has first moved the synchronizer ring 10, by the exerted gearshift force 18, to a countercone, not shown, of the clutch body 14. The blocking faces of the gearings 16 and 8 have here assumed transmission of the gearshift force 18 from the sliding sleeve 6 directly to the synchronizer ring 10. As long as a difference of speed exists between the synchronizer ring 10 and the clutch body 14, the friction torque on the friction cone faces, also not shown here, of the synchronizer ring 10 and clutch body 14 are stronger than the restoring torque through the chamfered blocking faces of the gearings 16 and 8. The sliding sleeve 6 is therefore locked against engagement with the clutch body 14.

Only when the speed difference between the synchronizer ring 10 and the clutch body 14 has been compensated and the friction torque thus removed, does the sliding sleeve 6 move the synchronizer ring 10 via the front tooth faces of the gearings 16 and 8 back to the "tooth on tooth gap" position (FIG. 4B). At the same time, the gearings 4 of the sliding sleeve 6 and the gearings 12 of the clutch body 14 come into contact. Changes compared to the known gearshifting cycle now result. As the gearing 4 of the sliding sleeve 6 and the gearing 12 of the clutch body 14 have no relative taper direct intermeshing of the gearings 4 and 12 is improbable.

To terminate the gearshifting operation despite this, the clutch gearing is dampened by a spring element 26 and tightened by the gearshift force 18 exerted by the driver. As soon as the gearshift lever is released at the end of the gearshifting movement (FIG. 4C), a ratchet device 20 takes care that the clutch gearings remain in a braced condition. The ratchet device 20 could here be constructed in such a manner that an element 22 be situated on the clutch body 14 while a second element 24 be provided on the sliding sleeve 6. Both elements 22 and 24 could here intermesh in a dampened manner. Any other form of ratchet is conceivable here.

Thus, the shifting of the gear is terminated for the driver and the feel of engagement is retained for him. As result of the missing tooth gradients when meshing, an eventually generated speed difference also does no longer lead to rejection forces that can be registered by the driver.

After the end of the gearshifting operation by the driver, the front faces of the gearings 4 and 12 of the clutch gearing provided for torque transmission are with great probability butting under prestress of the spring element 26. If the meshing has accidentally occurred already, the gearshifting operation is completely terminated. Otherwise, in the state of the braced butting of the gearings 4 and 12, the vehicle clutch, not shown here, is closed and the building up clutch torque 28 twists the gearings 4 and 12 against each other. A premature twisting of the gearings against each other is also possible due to drag torque on the wheel set of the transmission. The gearings 4 and 12 intermesh and the gearshifting is terminated (FIG. 4D).

If a direct intermeshing of the clutch gearing is obtained or the meshing is so quickly effected that no stopping is needed, since the gearshift force is still exterted, a ratchet device can be eliminated. The existing drag torques in a transmission gearshifting often makes said direct meshing possible. If the drag torques do not suffice, than the ratchet device is required, since the gearshift force, is no longer exerted by the driver, and the meshing occurs only with engagement of the clutch. For example, if the gearshifting is not manually carried out by a driver per shifting linkage, then the alternative of an automatic gearshifting by shifting means remotely controlled by the driver is also possible. The remote control can here take place also by interposition of a logical control which assumes the control on the shiftable speed levels. An automatic system not controlled by the driver can also assume total gearshifting of the transmission, the shifting being preferably always to the optimal ranges. Pneumatically actuated shifting means are predominantly used as shifting means.

The dampening element 26 can be any elastic element capable of absorbing the energy introduced by means of the gearshift force. Here, said elastic element must not be in the immediate proximity of the synchronizing arrangement. It is also possible that the elastic element be part of the shifting linkage or be situated thereon. As elastic elements are considered, for example, spring discs, shaft discs, pneumatic springs, torsion springs, rubber units, etc. Here torsion springs can be designed so as to effect not only an axial dampening upon the clutch gearing but also a simultaneously twisting of the clutch gearing.

To avoid rattling noises in the transmission, the elastic elements can be held under a certain prestress which prevents an undesired free play of the elements of the synchronizing arrangement. The spring characteristic curves of the elastic elements can have a diminishing course.

FIG. 5 shows a comparison of the course of the gearshift force applied via the shift stroke in known synchronizing devices 30 with synchronizing devices 32 according to the invention.

In the first place, it is to be clearly understood that the gearshifting of the synchronizing device according to the invention is terminated with a considerably reduced shift stroke.

The gearshift forces also drop differently. The required gearshift force of the synchronizing arrangement of the invention is clearly less than formerly. The gearshift force peaks in the cycle of the known synchronizing arrangement result from the butting of clutch gearings and the twisting of the clutch body. In the concept of the invention said elements do not impair the shifting characteristics for the driver. The slight increase of the gearshift force in the cycle is to be attributed to the engagement of the ratchet device, but it is negligible compared to the former gearshift force peaks. The cycle of the gearshift force is to be regarded only as an example for the utilization of the invention.

The invention is not limited to the arrangement shown here. It also covers all changes with which the expert in this field is familiar and which basically contain the idea of the invention.

REFERENCE NUMERALS 2 synchronizing arrangement
4 gearing
6 sliding sleeve
8 gearing
10 synchronizer ring
12 gearing
14 clutch body
16 gearing
18 gearshift force
20 ratchet device
22 element of the ratchet device
24 element of the ratchet device
26 spring element
28 clutch torque
30 gearshift force of the known synchronization
32 gearshift force of the synchronization according to the invention

I claim:

1. Transmission shift system with a synchronizing arrangement (2) utilizing a single clutch in which a rotary shaft and a gear rotating at different speeds can be coupled with positive engagement by means of an annular sliding sleeve (6) axially movable by gearshift force at synchronous speed, wherein a clutch gearing (4) of said sliding sleeve (6) meshes in a corresponding clutch gearing (12) of one of said gear and a clutch body (14) connected with said gear and a synchronizer ring (10) situated between said sliding sleeve (6) and said gear, parts of said one of said gear and said clutch body (14) together with parts of said synchronizer ring (10) form a positively engaged clutch and, in the absence of synchronism, axial movement of said sliding sleeve (6) is locked by blocking faces of a locking device (8, 16), which are separated from each other, said clutch gearing (4) of said sliding sleeve (6) and said clutch gearing (12) of said one of said gear and a clutch body (14) have non-tapered ends and at least one elastic element (26) is provided for dampening said clutch gearing (4, 12).

2. Transmission shift system with a synchronizing arrangement according to claim 1, wherein a ratchet device (20) holds said sliding sleeve (6) fast against the force of said elastic element (26) after elimination of the gearshift force (18).

3. Transmission shift system with synchronizing arrangement according to claim 1, wherein said gearshift force (18) is applied by gearshifting means.

4. Transmission shift system with a synchronizing arrangement according to claim 3, wherein control of said shifting means is automatic.

5. Transmission shift system with a synchronizing arrangement according to claim 1, wherein said elastic elements (26) are under prestress.

6. Transmission shift system with a synchronizing arrangement according to claim 1, wherein said elastic elements (26) are springs.

7. Transmission shift system with a synchronizing arrangement according to claim 6, wherein said spring is a torsion spring which acts in an axial direction and in a circumferential direction.

8. Transmission shift system with a synchronizing arrangement according to claim 1, wherein said clutch gearing (4) of said sliding sleeve (6) is dampened by at least said elastic element (26).

9. Transmission shift system with a synchronizing arrangement according to claim 1, wherein said clutch gearing (12) of said clutch body (14) is dampened by at least said elastic element (26).

10. Transmission shift system with a synchronizing arrangement according to claim 1, wherein at least part of said clutch gearings (4, 8, 12, 16) are tapered.

* * * * *